Dec. 20, 1949 S. O. MORRISON ET AL 2,492,054
REFRIGERATION THERMOSTATIC CONTROL
Filed Jan. 16, 1947 3 Sheets-Sheet 1

INVENTORS
Samuel O. Morrison
Blair Barnhart
BY Earl A. Gott
ATTORNEYS

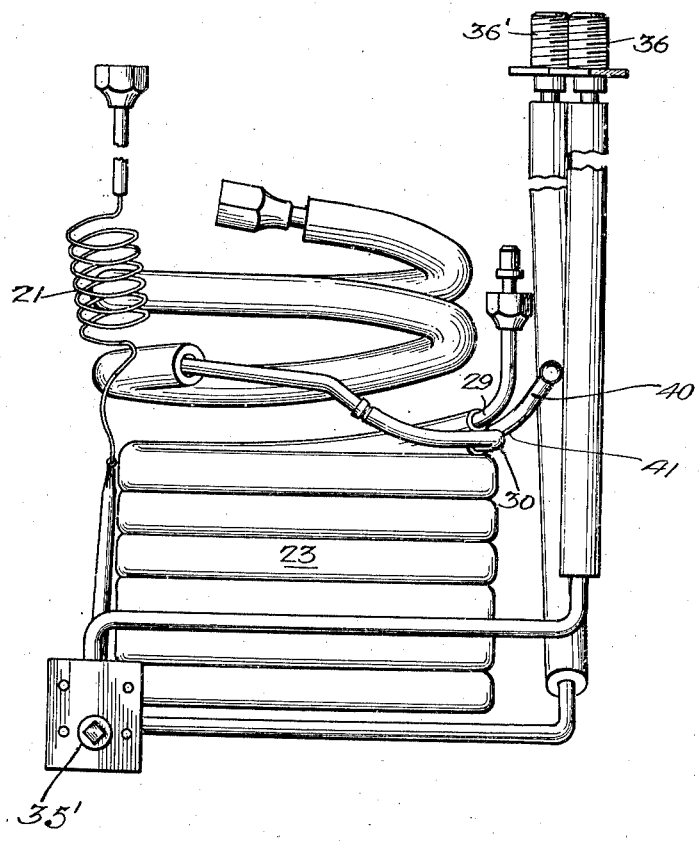
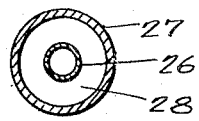

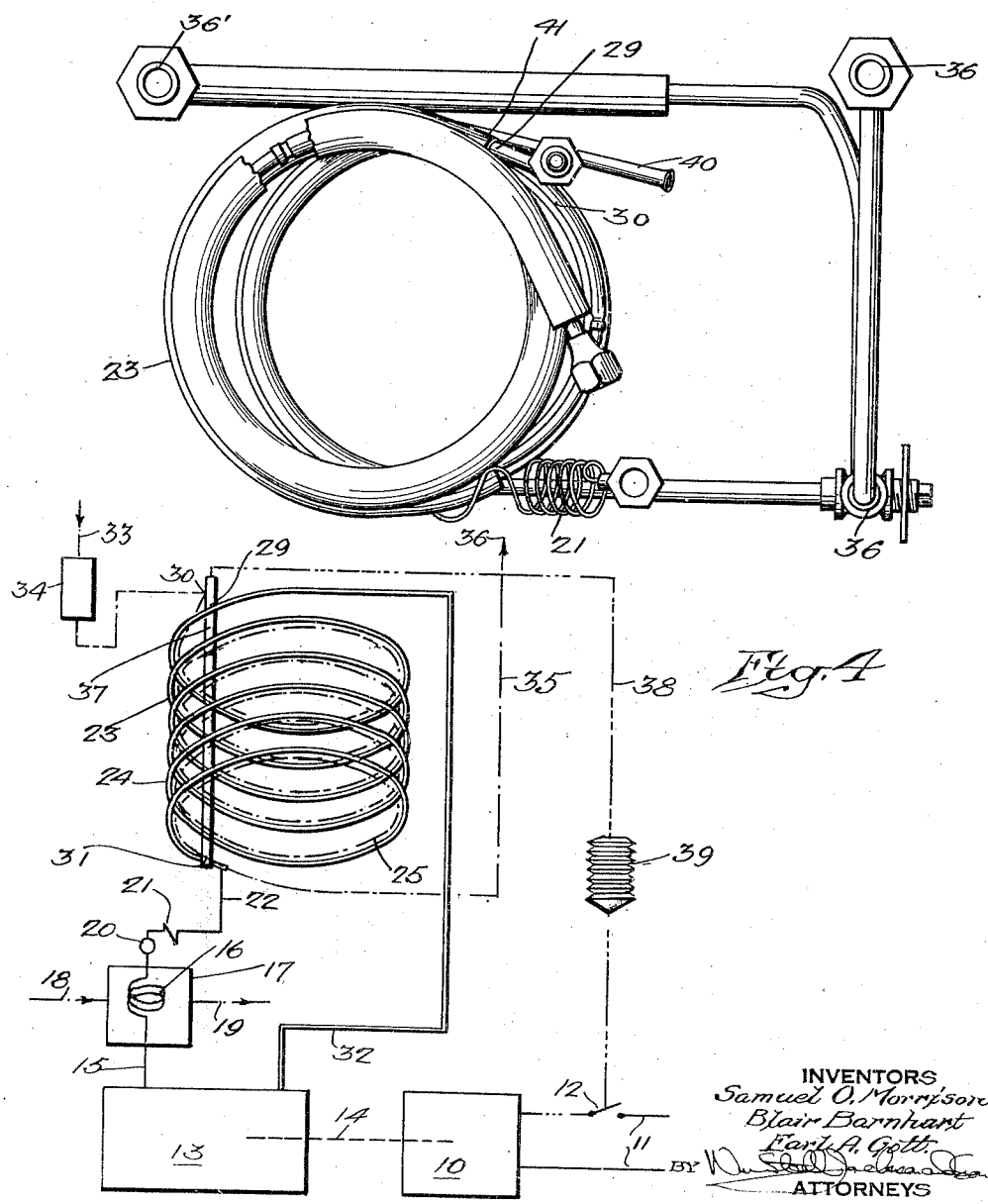

Patented Dec. 20, 1949

2,492,054

UNITED STATES PATENT OFFICE 2,492,054

REFRIGERATION THERMOSTATIC CONTROL

Samuel O. Morrison, Media, Blair Barnhart, Philadelphia, and Earl A. Gott, Lansdowne, Pa., assignors to Sunroc Refrigeration Company, Dover, Del., a corporation of Delaware Application January 16, 1947, Serial No. 722,356

7 Claims. (Cl. 62—7)

Our invention relates to refrigeration systems particularly of the type used for dispensing drinking water and variously known as drinking fountains or water coolers.

A purpose of our invention is to operate a mechanical refrigeration unit in an instantaneous type water cooler in response to the temperature of water entering heat transfer contact with the refrigerant and also of water leaving heat transfer contact with the refrigerant.

A further purpose is to shut off a mechanical refrigeration unit operating a tube-in-tube water cooler heat transfer unit by the temperature of water leaving the tube-in-tube unit and to turn on the mechanical refrigeration unit in response to the temperature of water entering the tube-in-tube unit.

A further purpose is to control the operation of a mechanical refrigeration unit by an expansion-type thermostat in a thermostat well which contacts the tube-in-tube unit where it has provision for water inlet and also where it has provision for water outlet, and which preferably extends diagonally across the tube-in-tube unit in heat transfer relation at intermediate points.

A further purpose is to apply an invariable constriction in the refrigerant flow immediately prior to entry of refrigerant into the tube-in-tube unit, and to control the entry of refrigerant in response both to the temperature of the water at the point where the refrigerant leaves heat transfer relation with the water and where it enters heat transfer relation with the water.

A further purpose is to prevent freeze-ups in a tube-in-tube heat transfer water cooler unit.

Further purposes appear in the specification and in the claims.

In the drawings we have chosen to illustrate one only of the many embodiments in which our invention might appear, choosing the form shown from the standpoints of convenience in illustration, satisfactory operation and clear demonstration of the principles involved.

Figure 2 is a rear elevation of the structure of Figure 1.

Figure 3 is a top plan view of the structure of Figure 1.

Figure 4 is a diagrammatic refrigeration and circuit lay-out, showing our invention applied to a water cooler system.

Figure 5 is a transverse section through the tube-in-tube heat transfer unit.

In the drawings like numerals refer to like parts throughout.

Figure 1:
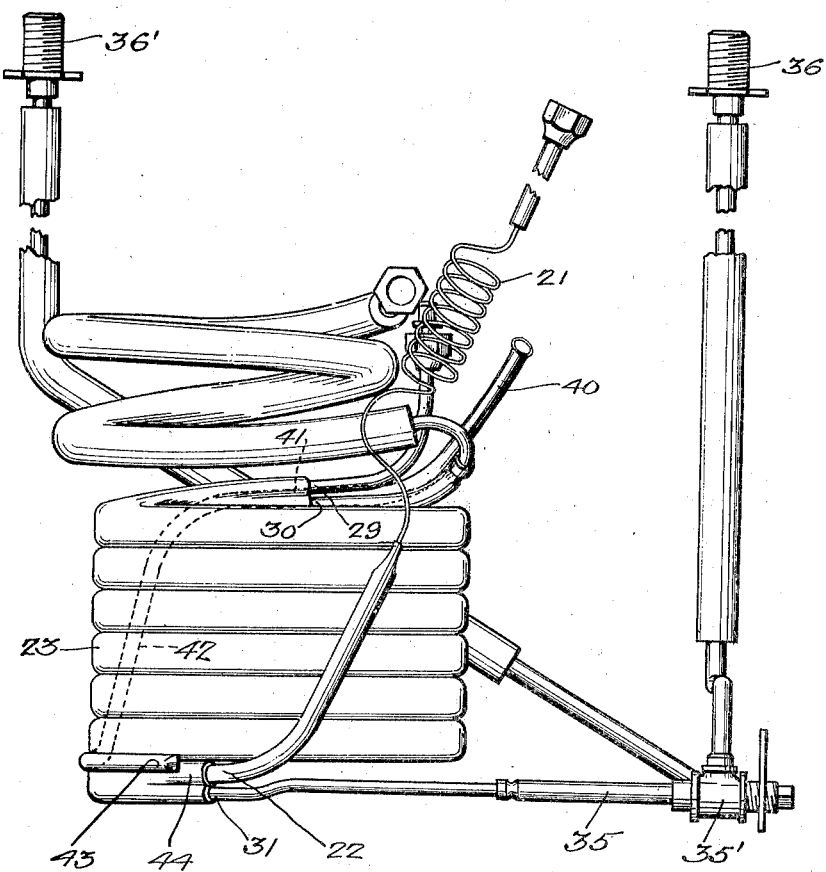
Figure 1 illustrates a tube-in-tube heat transfer unit of an instantaneous type water cooler embodying our invention, and shown in side elevation.

Refrigerated drinking fountains and water coolers are of two types. The older and very well known form is continuous in operation, attempting to maintain at all times a substantial supply of drinking water at a temperature suitable for drinking. These coolers, however, present serious difficulties in manufacture, an important one of which is the necessity for using a storage tank, which is likely to fail under abnormal pressure variations, and which frequently causes heat loss unless unusually good precautions are taken for heat insulation. In the instantaneous type as now known, the refrigerant and the drinking water are passed in countercurrent relation through a tube-in-tube heat transfer unit, and in the short time interval between turning on of the bubbler and beginning of the operation of drinking, sufficient water is refrigerated to provide the drink.

A serious problem has occurred in instantaneous type water coolers due to the fact that they necessarily are so rapid in cooling action, in order to be capable of instantaneous operation, that freeze-ups are likely to occur, particularly as the usual compressor type of mechanical refrigeration unit when starting up may produce a back pressure conducive to freezing.

In an effort to alleviate this condition, expansion valves have been employed in the refrigeration connection between the high pressure side of the refrigeration unit and the heat transfer unit, in order that by adjustment the expansion valves can control the back pressure and prevent freeze-ups.

The use of expansion valves is by no means always satisfactory. In the first place, they entail a considerable additional expense. In the second place, they leave the system very vulnerable to freeze-up in case of malfunctioning of the expansion valve, which of course is subject to difficulty since it involves a moving part or moving parts. One of the purposes of the present invention is to render the water cooler system less liable to malfunction, and to minimize the need for skilled labor which might be required in the installation, adjustment and maintenance of expansion valves.

We have discovered that expansion valves may be eliminated and superior control of water cooler operation maintained in a tube-in-tube or instantaneous type water cooler by a comparatively simple readjustment in the arrangement and operation of the usual expansion type thermostat which controls the refrigeration unit.

In accordance with our invention, the refrigerant is introduced countercurrent to the water in the tube-in-tube heat transfer unit, preferably merely through an invariable constriction. When we describe the constriction as "invariable" we do not, of course, mean that the constriction is necessarily uniform throughout its length or that it will necessarily be the same in any two water coolers or that it will necessarily be free from adjustment of setting, but we do mean that unlike an expansion valve the constriction will not change its diameter in response to the phase of the refrigeration cycle, but will remain of the same diameter at all times in the refrigeration cycle.

We connect the bulb, tube or other element of the thermostatic device controlling the operation of the refrigeration unit in heat transfer relation with the water as it leaves the tube-in-tube unit and also in heat transfer relation with the water as it enters the tube-in-tube unit. There is thus a shut-off action in case the leaving water becomes too cold and a starting action as soon as warm entering water influences the thermostatic element, and there is a certain averaging or balancing effect due to the fact that the thermostatic medium is in contact with both points and preferably also with intermediate portions of the tube-in-tube unit.

As best seen in Figure 4, a suitable refrigeration unit, preferably of the mechanical type, is employed, comprising a motor 10 receiving current from electrical leads 11 through a switch 12, driving a compressor 13 through a suitable mechanical connection 14. The compressor 13 supplies refrigerant such as Freon at high pressure and passes it out through a high side pipe 15 through suitable condenser passages 16. The condenser 17 of any conventional type receives a suitable cooling medium such as water or air through an inlet connection 18 and discharges the cooling medium at 19. From the condenser 17 the compressed cooled refrigerant suitably passes through a screen or dehydrator 20 and a constriction 21, suitably consisting of a coil of capillary tubing, preferably of the order of 0.010 to 0.050 inch in internal diameter.

From the constriction the now expanding refrigerant enters at 22, suitably at the bottom, a tube-in-tube heat transfer unit 23 having a gas passage 24 running from end to end of the coil separate from but in heat transfer relation to a water passage 25. This relationship is conveniently achieved by making the inner tube 26 (Figure 5) of copper or other metal of good heat conductivity, and passing the refrigerant through the inner tube, and making the outer tube 27 also of copper or other metal of good heat conductivity and passing the water in the space 28 between the inner and outer tube.

The tube-in-tube construction operates on the countercurrent principle, the gas leaving suitably at the top at 29 and the water entering at 30 adjacent the leaving point of the gas. Similarly the water leaves the tube-in-tube at 31 adjacent the entering point 22 of the refrigerant. From the exit point 29 of the gas, the gas returns to the suction side of the compressor by the connection 32.

The flow of water entering the water cooler at 33 is preferably first through a precooler 34 which is in heat transfer contact with the waste water from the bubbler, after which the water enters the tube-in-tube heat transfer unit at 30, flows through the water passage thereof and leaves at 31 to flow through the connection 35 to the bubbler or other discharge device 36. The thermostatic element 37 is in heat transfer relation with the water at the leaving point 31 and also in heat transfer relation with the water at the entering point 30, and is connected by a suitable tube 38 or the like to the thermostatic mechanism, desirably consisting of a bellows 39 operatively connected to the electric switch 12 to open the switch as the contraction of the thermostatic medium requires and to close the switch as the expansion of the thermostatic medium requires.

Referring now to Figures 1, 2 and 3, the tube-in-tube heat transfer unit 23 is shown as a single coil. Compressed refrigerant from the condenser enters the constrictor 21 and then flows to the tube-in-tube unit, entering it at the bottom at 22. The refrigerant leaves the tube-in-tube at the top at 29.

Water from the precooler enters at the top at 30 and leaves at the bottom at 31, flowing through the pipe 35, and the drainage connection 35' to the separate bubbler and drinking glass filler connections 36 and 36'.

The thermostatic well 40 makes heat transfer contact with the entering water adjacent the point 30 by its attachment to the tube-in-tube at 41 adjacent that location, extends diagonally in heat transfer contact with the intermediate turns of the tube-in-tube at 42, and makes heat transfer contact at 43 adjacent the leaving point of the water. The thermostat well is welded or soldered to the tube-in-tube at these various points.

Actually it is noted that the point 43 is back from the entrance of the water tube into the tube-in-tube construction for a short distance 44, usually in practice about an inch, due to the fact that the weld at the end extends approximately that distance, and the location 43 is the extreme location at which the refrigerant first gains heat transfer contact with the water.

In operation, once the device is operating, when an abnormal low temperature which would endanger a freeze-up is encountered, this first occurs at the location 43, and the thermostat medium at this location is cooled and contracts, causing the thermostatic bellows or other mechanism to open the switch, shutting off the motor and stopping the compressor. Thus the mechanism is prevented from freezing.

As soon as the bubbler or drinking water glass filler is opened, comparatively warm water is brought into contact with the thermostat at the point at 41 where the drinking water enters the tube-in-tube, and this warming action upon the thermostatic medium causes expansion of the medium which closes the switch 12 and causes the refrigerating mechanism to start up. It will be understood of course that the heat transfer contact at the top at 41 can act as an auxiliary shut-off, although this seldom occurs because of the quicker response at the point 43.

The intermediate contact of the thermostatic well with the tube-in-tube construction at 42 between the points 41 and 43 gives quicker response, because in case of abnormal cooling at 42 or abnormal warmth at 41 the copper or other metal of the tubing conducts the heat more rapidly than the water and a greater length of thermostatic well is subjected to the changed temperature condition by lateral heating or cooling from the outside wall of the tube-in-tube than would be the case if the thermostatic well were not in contact with the tube-in-tube over this intermediate space.

When the device starts up using a constrictor or capillary tube as in the present construction, there is likely to be a back pressure at the time of start-up which is conducive to freezing and if sustained and uncontrolled might cause a freeze-up. This is unlike the expansion valve system, which maintains the back pressure constant and prevents a freeze-up by this means. In the system of the present invention using a constrictor and without an expansion valve, the back pressure is not constant but is widely variable. After the system runs for some time using a constrictor, it will develop a back pressure which is not conducive to freezing, but under some conditions, before equilibrium is obtained under a back pressure not conducive to freezing, danger of a freeze-up will occur.

Thus under the present system the device may start up, operate for a short time, and if a back pressure conducive to freezing continues and an abnormal low temperature is produced at the location 43 near the entry of the refrigerant into the tube-in-tube construction, the thermostat may momentarily shut the compressor off, protecting against a freeze-up, and then shortly thereafter start up the mechanism again as soon as this danger is past. By this means, we employ the thermostat as a protecting device as well as a control device.

In prior art continuous coolers where constrictors have been employed, this danger has not existed because the mass of water to be cooled has been tremendous compared to the cooling capacity, but in our system where the cooling capacity is very great compared to the quantity of water to be cooled at any instant, the precautions provided for in the present invention are necessary.

In view of our invention and disclosure variations and modifications to meet individual whim or particular need will doubtless become evident to others skilled in the art, to obtain all or part of the benefits of our invention without copying the process and apparatus shown, and we, therefore, claim all such insofar as they fall within the reasonable spirit and scope of our claims.

Having thus described our invention what we claim as new and desire to secure by Letters Patent is:

1. The process of controlling a refrigeration system providing a source of refrigerant under pressure, which comprises passing drinking water and refrigerant countercurrent in heat transfer relation to one another and with the stream of one surrounding the stream of the other and flowing directly opposite thereto to provide instantaneous cooling of the drinking water, supplying refrigerant from the source in response to the temperature of the drinking water which first comes in heat transfer relation with the refrigerant and turning off the refrigerant in response to the temperature of the drinking water which last assumes heat transfer relation with the refrigerant.

2. The process of water cooling, using a refrigerant system providing a source of refrigerant under pressure, which comprises passing a stream of water in one direction through a tubular path, passing a stream of refrigerant from a source through a stream of invariable diameter and then through a tubular path in heat transfer relation to the stream of water and countercurrent to the water, the streams of water and refrigerant travelling in a direction directly opposite to one another and one stream travelling in an adjoining tubular path to the other stream, thermostatically controlling the starting of the flow of refrigerant in response to the temperature of the water as it first comes in heat transfer relation with the refrigerant and thermostatically controlling the stopping of the flow of refrigerant in response to the temperature of the water as it leaves heat transfer relation with the refrigerant.

3. In a water cooler or the like, a heat transfer unit having adjoining parallel tubes, one providing a passage for drinking water and the other providing a separate passage for refrigerant, a connection to the drinking water passage for passing drinking water through the same, means for passing refrigerant through the passage for refrigerant oppositely in direction from the flow of drinking water, a refrigeration unit connected to the means for passing refrigerant, and thermostatic means for turning off the refrigeration unit in response to the temperature of the drinking water as it leaves the heat transfer unit and for turning on the refrigeration unit in response to the temperature of the drinking water as it enters the heat transfer unit.

4. In a water cooler or the like, a tube-in-tube heat transfer unit having a passage for drinking water and a passage for refrigerant, a connection to the drinking water passage for passing drinking water through the passage for drinking water, means for passing refrigerant through the passage for refrigerant oppositely in direction from the flow of drinking water, a refrigeration unit connected to the means for passing refrigerant and an expansion type thermostat controlling the operation of the refrigeration unit and making heat transfer contact with the tube-in-tube unit adjacent the point where the drinking water enters and also adjacent the point where the drinking water leaves the tube-in-tube unit.

5. A heat transfer unit comprising adjoining parallel tubes having water and refrigerant passages, entrances and exits, a thermostatic well making heat transfer contact with the heat transfer unit at the point where the water enters the heat transfer unit, and at the point where the water leaves the heat transfer unit, a refrigeration unit connected to the heat transfer unit and an expansion type thermostat extending through the well and controlling the operation of the refrigeration unit.

6. In a water cooler or the like, a heat transfer unit comprising adjoining parallel tubes having separate passages for water and refrigerant, a connection to the drinking water passage for passing water through the water passage in one direction, mechanical refrigeration means for passing refrigerant through the refrigerant passage in the opposite direction, walls forming a constriction of invariable diameter in the refrigerant flow immediately prior to the arrival of the refrigerant at the heat transfer unit, and thermostatic means for starting the mechanical refrigeration unit in response to the temperature of water as it enters the heat transfer unit and for stopping the mechanical refrigeration unit in response to the temperature of the water as it leaves the heat transfer unit.

7. In a water cooler or the like, a heat transfer comprising adjoining parallel tubes having separate passages for water and refrigerant, a connection to the drinking water passage for passing water through the water passage in one direction, mechanical refrigeration means for passing refrigerant through the refrigerant passage in the opposite direction, walls forming a constriction of invariable diameter in the refrigerant flow immediately prior to the arrival of the refrigerant at the heat transfer unit, and an expansion type thermostat controlling the operation of the refrigeration unit and making temperature control contact with the heat transfer unit at the location of entry of water and also at the location of departure of water.

SAMUEL O. MORRISON.
BLAIR BARNHART.
EARL A. GOTT.

REFERENCES CITED

The following references are of record in the file of this patent:

UNITED STATES PATENTS

| Number | Name | Date |
|---|---|---|
| 2,171,740 | Brown | Sept. 5, 1939 |
| 2,278,225 | Taylor | Mar. 31, 1942 |
| 2,278,226 | Taylor | Mar. 31, 1942 |
| 2,359,790 | Rinehart | Oct. 10, 1944 |
| 2,359,791 | Ralston | Oct. 10, 1944 |